(12) United States Patent
Sibum et al.

(10) Patent No.: US 8,021,605 B2
(45) Date of Patent: Sep. 20, 2011

(54) TITANIUM ALLOY

(75) Inventors: Heinz Sibum, Essen (DE); Jürgen Kiese, Cottbus (DE); Manfred Kramer, Gifhorn (DE)

(73) Assignee: Thyssfnkrupp VDM GmbH, Werdohl (DE)

( * ) Notice: Subject to any disclaimer, the term of this patent is extended or adjusted under 35 U.S.C. 154(b) by 675 days.

(21) Appl. No.: 11/915,065

(22) PCT Filed: May 23, 2006

(86) PCT No.: PCT/EP2006/062522
§ 371 (c)(1),
(2), (4) Date: Jun. 13, 2008

(87) PCT Pub. No.: WO2006/125776
PCT Pub. Date: Nov. 30, 2006

(65) Prior Publication Data
US 2009/0035172 A1    Feb. 5, 2009

(30) Foreign Application Priority Data
May 23, 2005  (EP) .................................... 05011073

(51) Int. Cl.
*C22C 14/00*  (2006.01)

(52) U.S. Cl. .......................... 420/418; 420/417; 148/421

(58) Field of Classification Search .................. 420/417, 420/418; 148/421
See application file for complete search history.

(56) References Cited

U.S. PATENT DOCUMENTS

| | | | |
|---|---|---|---|
| 3,070,468 A | 12/1962 | Grant | |
| 3,074,829 A | 1/1963 | Novy et al. | |
| 6,007,923 A * | 12/1999 | Shimizu et al. | 428/586 |
| 2004/0069838 A1 | 4/2004 | Sibum | |

FOREIGN PATENT DOCUMENTS

| | | |
|---|---|---|
| DE | 10103169 A1 | 8/2002 |
| JP | 04 105 659 | 4/1992 |
| JP | 4-105659 | 4/1992 |
| JP | 2001089821 | 4/2001 |
| JP | 20011089821 | 4/2001 |
| RU | 2175992 C1 * | 11/2001 |
| WO | WO 02/058923 | 8/2002 |
| WO | WO-02/058923 | 8/2002 |

OTHER PUBLICATIONS

Zhang et al., Effect of Trace Cerium on Thermal Stability of ZT3 Cast Titanium Alloy, 1987, Zhongguo Xitu Xuebao, vol. 5, Issue 1, p. 71-76, English abstract only.*
Zhang, S. et al., Effect of Carbon on Upper (Alpha+Beta) Phase Field of Ti-5.6AI-4.8Sn-2.0Zr-1Mo-0.34Si-0.7Nd Titanium Alloy, Materials Science and Technology, Feb. 2004, Maney Publishing, vol. 20, No. 2, p. 167-172, English abstract only.*
Kablov et al., English abstract of RU 2175992 C1, Nov. 2001.*
International Search Report for PCT/EP2006/062522, Jul. 17, 2006.

* cited by examiner

*Primary Examiner* — Roy King
*Assistant Examiner* — Caitlin Fogarty
(74) *Attorney, Agent, or Firm* — Jordan and Hamburg LLP

(57) ABSTRACT

A titanium alloy which, even under the influence of high application temperatures, has a low tendency to becoming brittle as a result of coarse grain formation, comprises (in wt. %) Fe: $\leq$2%, Si: 0.01 to 0.8%, 0: $\leq$0.3%, C: $\leq$0.1%, one or more elements of the Lanthanide group at total levels of 0.01-2% and, optionally, one or more elements of Al and O at total levels of a maximum of 1%, one or more elements of Mo, Ta, Nb, Zr, Mn, Cr, Co, Ni, Cu, V, Si, and H at total levels of a maximum of 3%, the remainder being titanium and unavoidable impurities.

18 Claims, 2 Drawing Sheets

TITANIUM ALLOY

CROSS-REFERENCE TO RELATED APPLICATIONS

Figure 1A:
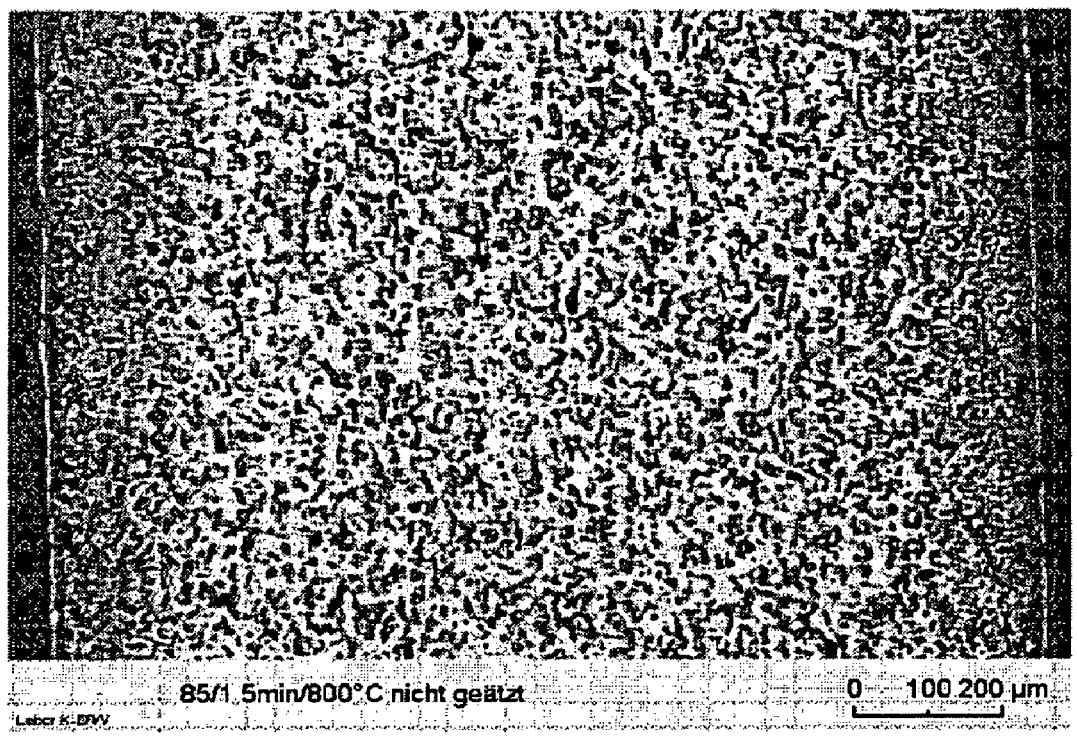

This application is a national phase application of International Application No. PCT/EP2006/062522, filed May 23, 2006, which claims the benefit of and priority to European Application No. 05 011 073.3, filed May 23, 2005, which is owned by the assignee of the instant application. The disclosure of each of the above applications is incorporated herein by reference in its entirety.

FIELD OF THE INVENTION

The invention relates to a titanium alloy that is suitable for high-temperature use.

BACKGROUND OF THE INVENTION

Owing to their low weight, titanium materials are particularly suitable for the production of components for vehicle construction. However, use of conventional titanium alloys in the region of the exhaust gas system of internal-combustion engines is fundamentally opposed by the fact that in the case of heating to temperature above 600° C. they have a risk of fracture as a consequence of coarse grain formation. Coarse grain formation occurs in particular if the titanium material is exposed to a high operating temperature for a relatively long time.

Attempts have been made to alleviate the problem of coarse grain formation by alloying titanium with Fe or Si. These elements each have a grain-refining effect. However their drawback lies in the fact that as the Si and Fe contents increase, the ductility of the titanium material decreases so drastically that it can no longer be economically shaped. This property of titanium materials alloyed with Fe and Si has proven to be particularly disadvantageous if components with complex shapes are to be produced therefrom for the exhaust gas system of an internal-combustion engine.

A further possibility of reducing the risk of embrittlement as a result of oxidation of a titanium material is known from DE 101 03 169 A1. According to the method described in this document a titanium sheet is provided with an Al covering layer by roll-bonding and heat-treatment, which covering layer protects the Ti sheet from oxidation. However, the Al covering layer cannot prevent coarse grain formation in the Ti base material that occurs as a consequence of high-temperature heating that lasts a relatively long time.

In addition to the above-described prior art a Ti alloy is known from JP 2001 089821 A which contains (in % by weight) more than 1% and up to 5% Fe, 0.05 to 0.75% O and furthermore $0.01 * e^{(0.5 *\% Fe)}$ to $0.5 * e^{-(0.5 *\% Fe)}$% Si, where % Fe represents the respective Fe content. The thus composed Ti alloy is intended not only to have high strength and be very ductile but should also have excellent resistance to oxidation at high temperatures. In practice however it has been found that even Ti alloys composed in this manner cannot permanently withstand the operating temperatures which occur for example in the region of exhaust gas systems of motor vehicles.

A Ti alloy for biological applications is also known from JP 04 105659 A, in particular for the production of artificial bones, which in addition to silicon contents should also contain yttrium contents to optimise compatibility of the alloy with the body. When processing this known Ti alloy a heat treatment is carried out which causes a near-surface layer to form in which Si and Y are present in enriched form. This document does not address the problem of high-temperature resistance of a Ti alloy, however.

SUMMARY OF THE INVENTION

The invention, in one embodiment, features a titanium alloy, which even under the effect of high application temperatures, has only a slight tendency to embrittlement as a consequence of coarse grain formation.

A Ti alloy of this type has the following composition (in % by weight) according to the invention:
Fe: $\leq 2\%$,
Si: 0.01 –0.8%,
O: $\leq 0.3\%$,
C: $\leq 0.1\%$,
one or more element(s) from the group comprising the lanthanides in contents which total 0.01 to 2%,
and optionally
one or more element(s) from the group comprising Al, O in contents which total a maximum of 1%,
one or more element(s) from the group comprising Mo, Ta, Nb, Zr, Mn, Cr, Co, Ni, Cu, V, H in contents which total a maximum of 3%,
the remainder being titanium and unavoidable impurities.

DESCRIPTION OF THE INVENTION

Owing to the presence of one or more rare earth metals from the group comprising the lanthanides (La, Ce, Pr, Nd, Pm, Sm, Eu, Gd, Tb, Dy, Ho, Er, Tm, Yb, Lu) a titanium alloy composed according to the invention has particularly good high-temperature resistance. The lanthanides in the Ti alloy according to the invention lead to the oxygen contained in the titanium alloy being bound and therefore no longer being able to have an adverse effect on the ductility of the material in the event of heating of a metal sheet or component made from the titanium material according to the invention.

Surprisingly it has been found that lanthanide contained in the alloy according to the invention effectively suppresses grain growth even with relatively long periods of heating in high-temperature ranges of 600° C. to 1,000° C. For this reason titanium alloys according to the invention are eminently suitable for producing components which are exposed during their practical use to high temperatures over a long action time. Thus for example metal sheets made from a titanium alloy according to the invention may be particularly effectively used to manufacture components for exhaust gas systems of powerful motor vehicles.

Their properties, achieved as a consequence of the presence according to the invention of one or more element(s) from the group comprising "lanthanum, cerium, praseodymium, neodymium, promethium, samarium, europium, gadolinium, terbium, dysprosium, holmium, erbium, thulium, ytterbium and lutetium", make titanium alloys according to the invention particularly suitable for producing components that are used at temperature of more than 800° C. over a total action time of at least 50 hours. Particularly high-quality components, which can reliably cope with the requirements that are made in practice, of an exhaust gas system for internal-combustion engines may therefore be produced from an alloy according to the invention.

Silicon also contributes to grain refining in the Ti alloy according to the invention. The maximum Si content is limited to 0.8% by weight in this case in order to reliably prevent an excessive reduction in the ductility of the material according to the invention. Silicon has optimised effects on the properties of the alloy according to the invention if it is present in contents of 0.25 to 0.5% by weight.

In this connection, for additional protection against oxidation it can be expedient to provide titanium material according to the invention with an aluminium or other covering layer suitable for this purpose, for example according to the model of the procedure known from DE 101 03 169 A1. Optimum usage properties can be guaranteed for a titanium alloy according to the invention, in particular together with an Al covering layer of this kind, even after a relatively long action time in the high-temperature range of more than 800° C., in particular more than 950° C.

Field tests have shown that the lanthanide rare earth metal contents in a titanium alloy according to the invention are optimal if they amount to 0.5 to 1.0% by weight. Cerium and lanthanum are preferably used as the lanthanides in this connection, alone or in combination respectively. An La and/or a Ce composition metal may also be considered.

If there is iron in the titanium alloy according to the invention then in order to assist the formation of an advantageously finely grained structure with regard to optimal ductility, the Fe content is limited according to the invention to a maximum of 2% by weight to adjust the hardening that likewise occurs with the addition of Fe such that the Ti material may still be acceptably shaped even at low temperatures. The grain-refining effect of iron occurs in this case if the Fe content is at least 0.03% by weight. Optimised effects of Fe result if the Fe content is 0.03 to 0.3% by weight.

The oxygen content of a Ti alloy according to the invention is limited to a maximum of 0.3% by weight in order to ensure that during the course of heat treatment, which is required for integral joining after the application of the Al covering layer when producing a composite according to the invention, the oxygen content does not increase an upper limit that is critical with regard to the required ductility. Practical tests have shown that optimum properties of a Ti alloy according to the invention and a composite according to the invention produced by using this Ti alloy are established if the oxygen content of the Ti alloy is 0.03 to 0.25% by weight.

Aluminium has a stabilising effect on the α phase of Ti alloys. However, in order to avoid undesirable oxidation of the Ti material the Al content of an alloy according to the invention is limited to a maximum of 1.0% by weight. To reliably use the effect of aluminium and the other elements belonging to the group of a phase-stabilising elements, aluminium and oxygen, the contents of these elements can be at least 0.02% by weight, preferably at least 0.05% by weight, in a Ti alloy according to the invention.

The elements belonging to the group Mo, Ta, Nb, Zr, Mn, Cr, Co, Ni, Cu, V, Si, H stabilise the β phase of Ti alloys. To use this effect at least one of these elements should be present in contents of at least 0.03 to 2% by weight.

The invention will be described in more detail hereinafter with reference to an embodiment.

Firstly, a titanium alloy according to the invention, which, in addition to titanium and unavoidable impurities, contained 0.4% by weight Si, 0.2% by weight Fe and 0.6% by weight La, is melted and rolled to form a Ti strip with a thickness of 1.25 mm.

To avoid absorption of oxygen, according to the method known from DE 101 03 169 A1 and based on the Ti alloy according to the invention, a composite E was then produced by applying by roll-bonding a 0.1 mm thick Al foil as a covering layer to the Ti strip being used as a base layer of the composite. The Al covering layer applied to the titanium base material in this way had a thickness of 0.04 mm following roll-bonding.

After roll-bonding components for the exhaust gas system of an internal-combustion engine used in a car were formed from the composite E. Without having been subjected to a separate heat treatment the relevant components were then fitted in the respective vehicle. The heating of the exhaust gas system that results on initial operation subsequently led to a titanium-aluminium mixed oxide layer forming between the Al covering layer and the Ti base layer by way of which covering layer and base layer were integrally and non-detachably joined together.

For comparison, a composite V, of which the Ti base layer contained 0.4% by weight Si and 0.2% by weight Fe in addition to titanium and unavoidable impurities, was produced in the same manner.

Table 1 gives the modulus of elasticity "E", the 0.2% proof stress "$R_{p0.2}$", the tensile strength "$R_m$" and the elongation "A" after five minutes' use and after 100 hours' use at 800° C. in each case for the composite E produced on the basis of a Ti alloy according to the invention and the composite V produced for comparison.

TABLE 1

| | Action time (T = 800° C.) | E [GPa] | $R_{p0.2}$ [MPa] | $R_m$ [MPa] | A [%] |
|---|---|---|---|---|---|
| E | 5 min | 107.46 | 294.70 | 449.91 | 22.2 |
| E | 100 h | 106.31 | 319.90 | 428.66 | 25.4 |
| V | 5 min | 101.84 | 286.64 | 408.29 | 27.4 |
| V | 100 h | 110.04 | 318.51 | 405.42 | 21.6 |

It shows that the composite E produced by using the Ti alloy according to the invention still has properties that are adequate for its operationally reliable use even after the long action time of 100 hours.

Figure 1B:
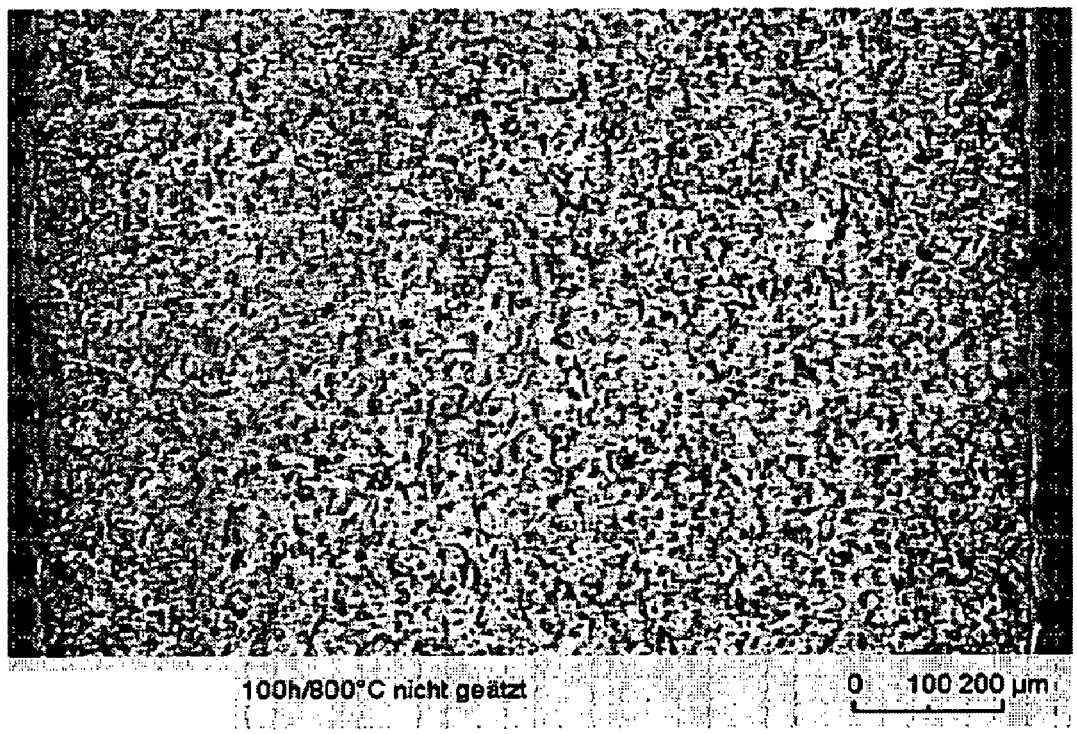

FIG. 1a shows a micrograph of the Ti base layer composed according to the invention of a sheet metal sample of the composite E after 5 minutes' use at 800° C. The sample has a clear, fine-grained structure. FIG. 1b similarly shows a micrograph of the Ti base layer of the same sheet metal sample of the composite after 100 hours' use at 800° C. This sample has a substantially unchanged fine-grained structure.

Figure 2A:
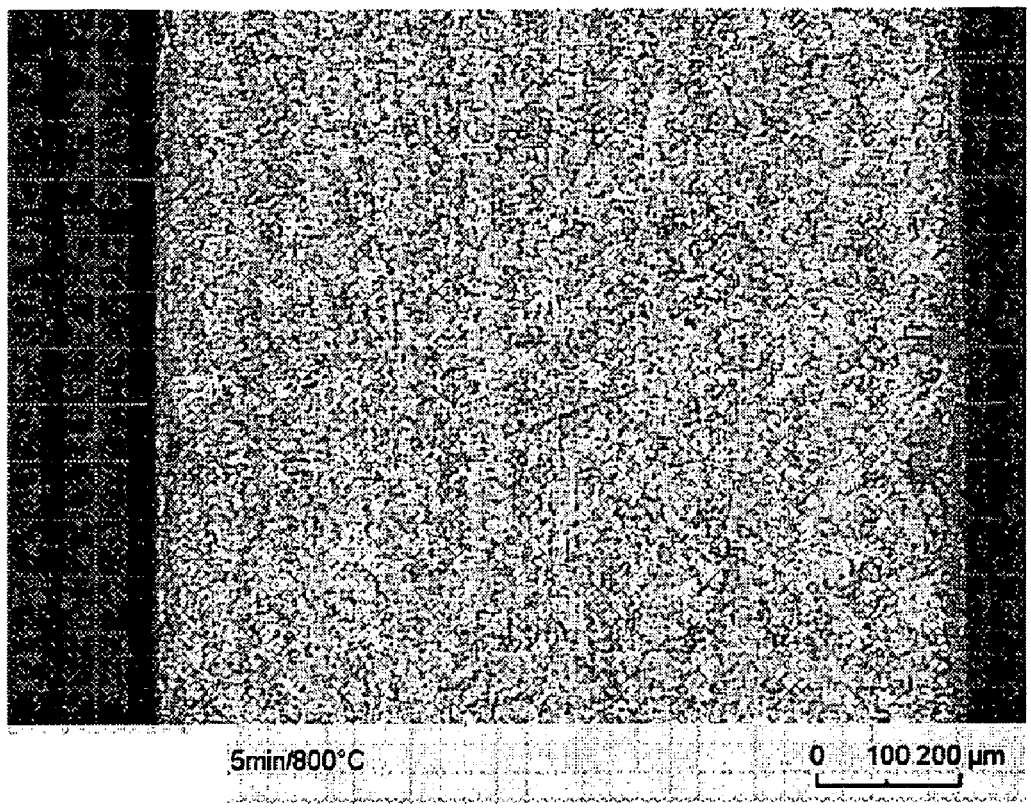
Figure 2B:
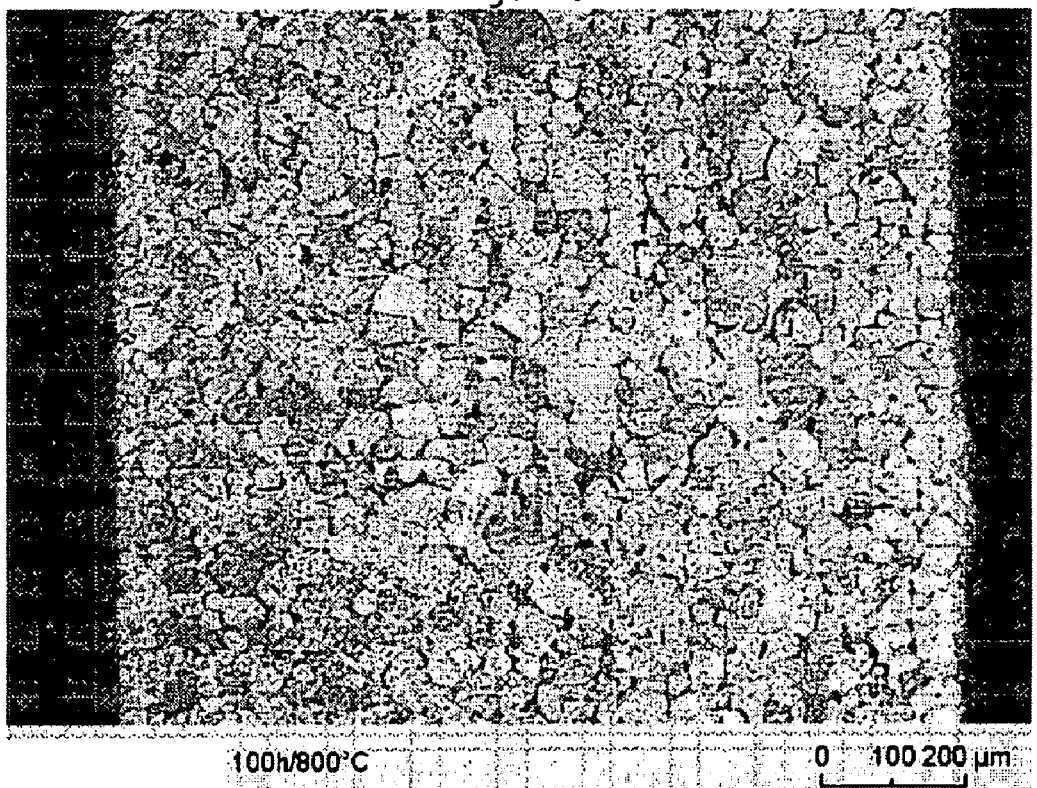

FIG. 2a shows a micrograph of the Ti base layer of a sheet metal sample of the composite V cited for comparison after 5 minutes' use at 800° C. The sample has a structure which owing to the absence of rare earth metal contents is already coarser than the structure of the sample shown in FIG. 1a. The micrograph, shown in FIG. 2b, of the Ti base layer of the same sheet metal sample after 100 hours' use at 800° C. by contrast shows a clear coarse grain formation which accompanies a likewise clear embrittlement of the Ti base layer of the composite V manufactured for comparison.

The invention claimed is:

1. A titanium alloy comprising the following composition (in % by weight)

Fe: ≦2%,
Si: 0.01 to 0.8%,
O: ≦0.3%,
C: ≦0.1%,
Al: ≦0.02 to 1.0%,
one or more lanthanide elements from the group consisting of lanthanum, cerium, praseodymium, neodymium, promethium, samarium, europium, gadolinium, terbium, dysprosium, holmium, erbium, thulium, and ytterbium in contents which total 0.01 to 2%, and
the remainder being titanium and unavoidable impurities.

2. The titanium alloy according to claim 1, wherein the Fe content is 0.03% to 2% by weight.

3. The titanium alloy according to claim 2, wherein the Fe content is 0.03 to 0.3% by weight.

4. The titanium alloy according to claim 1, wherein the Si content is 0.25 to 0.5% by weight.

5. The titanium alloy according to claim 1, wherein the oxygen content is 0.03% to 0.3% by weight.

6. The titanium alloy according to claim 5, wherein the oxygen content is 0.03 to 0.25% by weight.

7. The titanium alloy according to claim 1, wherein the lanthanide element content is 0.5 to 1.0% by weight.

8. The titanium alloy according to claim 1, comprising at least one of La and Ce as the lanthanide element.

9. The titanium alloy according to claim 1, comprising at least one of a La and Ce composition metal as the lanthanide element.

10. The titanium alloy according to claim 1, wherein the amount of Al is 0.05 to 1.0%, by weight, and the amount of O is 0.05 to 0.3% by weight.

11. The titanium alloy according to claim 1, further comprising one or more elements of the group consisting of Mo, Ta, Nb, Zr, Mn, Cr, Co, Ni, Cu, V, and H in contents of at least 0.03% by weight.

12. The titanium alloy of claim 1, wherein a combined amount of Al and O is less than or equal to 1% by weight.

13. The titanium alloy of claim 12 further comprising one or more elements from the group consisting of Mo, Ta, Nb, Zr, Mn, Cr, Co, Ni, Cu, V, and H in contents which total a maximum of 3%.

14. The titanium alloy of claim 1 further comprising one or more elements from the group consisting of Mo, Ta, Nb, Zr, Mn, Cr, Co, Ni, Cu, V, and H in contents which total a maximum of 3%.

15. A method of using a titanium alloy, comprising:
receiving a component comprising the titanium alloy comprising the following composition (in % by weight):
Fe: $\leq 2\%$,
Si: 0.01 to 0.8%,
O: $\leq 0.3\%$,
C: $\leq 0.1\%$,
Al: 0.02 to 1.0%,
one or more lanthanide elements from the group consisting of lanthanum, cerium, praseodymium, neodymium, promethium, samarium, europium, gadolinium, terbium, dysprosium, holmium, erbium, thulium, and ytterbium in contents which total 0.01 to 2%,
the remainder being titanium and unavoidable impurities; and
using the component at temperatures greater than 800° C. over a total action time of at least 50 hours.

16. The method of claim 15 wherein the component is part of an exhaust system for an internal-combustion engine.

17. The method of claim 15 wherein the titanium alloy includes a combined amount of Al and O that is less than or equal to 1% by weight.

18. The method of claim 15 wherein the titanium alloy further comprises one or more elements from the group consisting of Mo, Ta, Nb, Zr, Mn, Cr, Co, Ni, Cu, V, and H in contents which total a maximum of 3%.

* * * * *

UNITED STATES PATENT AND TRADEMARK OFFICE
CERTIFICATE OF CORRECTION

PATENT NO. : 8,021,605 B2
APPLICATION NO. : 11/915065
DATED : September 20, 2011
INVENTOR(S) : Heinz Sibum, Juergen Kiese and Manfred Kramer It is certified that error appears in the above-identified patent and that said Letters Patent is hereby corrected as shown below:

TITLE PAGE,
Please correct the name of the Assignee from:

(73)    Assignee:    "Thyssfnkrupp" VDM GmbH, Werdohl (DE)

to

(73)    Assignee:    --Thyssenkrupp-- VDM GmbH, Werdohl (DE)

Signed and Sealed this
Twenty-second Day of November, 2011

David J. Kappos
*Director of the United States Patent and Trademark Office*

UNITED STATES PATENT AND TRADEMARK OFFICE
CERTIFICATE OF CORRECTION

PATENT NO. : 8,021,605 B2  
APPLICATION NO. : 11/915065  
DATED : September 20, 2011  
INVENTOR(S) : Heinz Sibum, Juergen Kiese and Manfred Kramer Page 1 of 1

It is certified that error appears in the above-identified patent and that said Letters Patent is hereby corrected as shown below:

TITLE PAGE,  
Please correct the name of the Assignee from:

(73) Assignee: "Thyssfnkrupp" VDM GmbH, Werdohl (DE)

to

(73) Assignee: --ThyssenKrupp-- VDM GmbH, Werdohl (DE)

This certificate supersedes the Certificate of Correction issued November 22, 2011.

Signed and Sealed this  
Fourteenth Day of February, 2012

David J. Kappos  
*Director of the United States Patent and Trademark Office*